(12) United States Patent
Miller et al.

(10) Patent No.: US 8,225,511 B2
(45) Date of Patent: Jul. 24, 2012

(54) PORTABLE DIRECT ACTION BRITTLE PIPE/SOIL PIPE CUTTER

(75) Inventors: Christopher Miller, Westlake, OH (US); Robert Skrjanc, Lorain, OH (US)

(73) Assignee: Emerson Electric Co., St. Louis, MO (US)

( * ) Notice: Subject to any disclaimer, the term of this patent is extended or adjusted under 35 U.S.C. 154(b) by 339 days.

(21) Appl. No.: 12/630,375

(22) Filed: Dec. 3, 2009

(65) Prior Publication Data

US 2011/0056081 A1  Mar. 10, 2011

Related U.S. Application Data

(60) Provisional application No. 61/241,143, filed on Sep. 10, 2009.

(51) Int. Cl.
*B23D 21/06* (2006.01)
(52) U.S. Cl. .......................................................... 30/100
(58) Field of Classification Search ................ 30/92, 96, 30/100, 101; 83/830–832, 863, 864, 879–887; 82/46, 47, 70.1, 70.2
See application file for complete search history.

(56) References Cited

U.S. PATENT DOCUMENTS

| | | | | |
|---|---|---|---|---|
| 444,995 A * | 1/1891 | Vanderman | ..................... | 30/100 |
| 492,833 A * | 3/1893 | Porter | ............................. | 30/100 |
| 538,072 A * | 4/1895 | Hall | ................................ | 30/100 |
| 553,663 A * | 1/1896 | Anderson | ....................... | 30/100 |
| 825,215 A * | 7/1906 | Holland | .......................... | 30/100 |
| 930,755 A * | 8/1909 | Holland | .......................... | 30/100 |
| 1,256,799 A * | 2/1918 | Hime | ............................... | 30/100 |
| 1,428,712 A * | 9/1922 | Sanders | .......................... | 30/100 |
| 1,872,199 A * | 8/1932 | Way | ................................. | 30/101 |
| 2,629,925 A * | 2/1953 | Gill et al. | ........................ | 30/100 |
| 2,716,280 A * | 8/1955 | Ruhe | ............................... | 30/100 |
| 2,793,433 A | 11/1956 | Wheeler | | |
| 2,835,969 A * | 5/1958 | Wheeler | ......................... | 30/100 |
| 2,949,669 A * | 8/1960 | Wheeler | ......................... | 30/100 |
| 2,950,035 A * | 8/1960 | Wheeler | ......................... | 30/100 |
| 3,001,283 A * | 9/1961 | Woods et al. | ................... | 30/100 |
| 3,023,655 A * | 3/1962 | McDaniel | ....................... | 30/100 |
| 3,027,638 A * | 4/1962 | Fightmaster | .................... | 30/100 |
| 3,129,865 A * | 4/1964 | Coblitz | ............................. | 30/92 |
| 3,157,945 A * | 11/1964 | Picking | ............................ | 30/100 |
| 3,166,620 A * | 1/1965 | Galezniak | ........................ | 30/96 |
| 3,283,978 A * | 11/1966 | Coblitz | ............................ | 30/100 |
| 3,307,760 A * | 3/1967 | Small et al. | ....................... | 225/1 |
| 3,309,002 A * | 3/1967 | Enos | ................................ | 30/100 |
| 3,341,098 A * | 9/1967 | Singley | ........................... | 30/100 |
| 3,430,830 A * | 3/1969 | Coblitz | ............................ | 30/100 |
| 3,487,543 A * | 1/1970 | Coblitz | ............................ | 30/100 |

(Continued)

FOREIGN PATENT DOCUMENTS
CH          602289 A5 *   7/1978
(Continued)

*Primary Examiner* — Jason Daniel Prone
(74) *Attorney, Agent, or Firm* — Rankin, Hill & Clark LLP (57) ABSTRACT

A lightweight, portable, and relatively small cutting tool is described. The tool engages with a standard press tool and is used for cutting brittle pipe such as cast iron soil pipe. The tool features a cutting chain assembly that is tensioned about the pipe by a movable ram block. The ram block is displaced by a ram or hydraulic cylinder in the press tool.

19 Claims, 4 Drawing Sheets

U.S. PATENT DOCUMENTS

| | | | | |
|---|---|---|---|---|
| 3,540,640 A | * | 11/1970 | Coblitz | 30/100 |
| 3,546,986 A | * | 12/1970 | Blake | 82/47 |
| 3,564,711 A | * | 2/1971 | McFarland | 30/100 |
| 3,704,516 A | * | 12/1972 | Ono | 30/96 |
| 3,763,559 A | | 10/1973 | Axbjer | |
| 3,943,626 A | * | 3/1976 | Williams | 30/100 |
| 4,271,591 A | | 6/1981 | Aubriot | |
| 4,370,995 A | * | 2/1983 | Smith | 83/863 |
| 4,663,844 A | * | 5/1987 | Vegge | 30/100 |
| 4,763,413 A | * | 8/1988 | Rothenberger | 30/100 |
| 5,086,961 A | * | 2/1992 | Angel et al. | 30/101 |
| 5,461,955 A | * | 10/1995 | Weisshaar | 83/880 |
| 6,122,827 A | * | 9/2000 | Whitaker | 30/96 |
| 6,141,876 A | | 11/2000 | Hamm | |
| 7,124,608 B2 | | 10/2006 | Goop | |
| 7,478,480 B2 | | 1/2009 | Loporchio et al. | |
| 2002/0124710 A1 | | 9/2002 | MacDonald | |
| 2006/0137189 A1 | * | 6/2006 | Dole | 30/100 |
| 2010/0024613 A1 | * | 2/2010 | Choi | 82/47 |

FOREIGN PATENT DOCUMENTS

| | | | |
|---|---|---|---|
| DE | 4214478 A1 | * | 11/1993 |
| FR | 2660585 A1 | * | 10/1991 |
| GB | 2048746 A | * | 12/1980 |
| GB | 2059851 A | * | 4/1981 |
| JP | 55112718 A | * | 8/1980 |
| JP | 56062714 A | * | 5/1981 |
| JP | 60006306 A | * | 1/1985 |

* cited by examiner

PORTABLE DIRECT ACTION BRITTLE PIPE/SOIL PIPE CUTTER

CROSS REFERENCES TO RELATED APPLICATIONS

This application claims priority upon U.S. provisional application Ser. No. 61/241,143 filed on Sep. 10, 2009, hereby incorporated by reference.

FIELD OF THE INVENTION

The present invention relates to a portable tool for cutting relatively brittle pipe such as cast iron soil pipe.

BACKGROUND OF THE INVENTION

A wide array of soil pipe cutters are known in the art. Many of these use lever arms that transmit force to a ratchet assembly which in turn tensions a cutting chain wrapped about a pipe to be cut. Typically, such lever arms are relatively long in order for a user to generate the requisite amount of force for advancing the ratchet assembly and tightening the chain. When cutting soil pipe, and particularly previously installed pipe sections, access to the pipe is usually limited. For example, for buried pipe, after exposing the pipe by digging, the walls of the trench or hole frequently limit the degree of access around the pipe. As will be appreciated, it is undesirable to continue digging additional areas around the pipe to increase access. Also, limited access may exist for pipe installed in walls or under floors in buildings or other structures. Thus, while the use of cutters using lever arms is acceptable for uninstalled pipe, such cutters are not preferred and in many instances entirely unacceptable for situations in which pipe access is limited.

Another type of soil pipe cutter utilizes a scissor mechanism. The scissor mechanism is expanded or collapsed at one end to generate an opposite but amplified force at another end of the mechanism, at which a cutting chain is attached. Thus, operation of a scissor mechanism typically involves an expansion of the assembly at least somewhere around the region of pipe to be cut. Although satisfactory in many regards, the scissor mechanism can become obstructed or otherwise interfered with when attempting to cut pipe in limited access environments.

Additional examples of pipe cutters include the pipe cutting system described in US Patent Application Publication 2002/0124710 to MacDonald and a cutter commercially available from Wheeler-Rex under the designation 2500 KWIKSNAP. These cutters feature relatively large work surfaces for supporting a pipe and an enclosure for housing a power assist system for tensioning the cutting chain. Although satisfactory for cutting free or uninstalled sections of pipe, these devices are not appropriate for limited access cutting situations such as for installed or buried pipe. Furthermore, these devices are not amenable for transport from one cutting site to another.

Accordingly, a need remains for a portable, relatively small pipe cutter that is free of bulky components such as lengthy lever arms and expandable scissor mechanisms.

SUMMARY OF THE INVENTION

The present invention provides a cutting tool using a cutting chain that is tensioned about a pipe to be cut. The tool is engaged with a conventional press tool. Operation of the press tool and displacement of a ram causes tightening of the cutting chain and subsequent fracture and/or cutting of the pipe. The cutting tool can accommodate a variety of different size pipes, is relatively small and portable, and can be used in limited access cutting environments.

In a first aspect, the present invention provides a pipe cutter comprising a frame adapted for engagement with a press tool providing an extendable powered cylinder. The pipe cutter also comprises a linearly displaceable ram guidably retained within the frame. The ram is movable in a first direction upon application of a compressive force from the powered cylinder of the press tool. The pipe cutter also comprises a cutting chain having a first end coupled to the ram and configured to be movable in the first direction upon application of the compressive force to the ram. The chain also has a second end selectively stationary and engaged to the frame. The pipe cutter utilizes a cutting confine which is defined as the sum of (i) the distance between the first end of the chain and the second end of the chain as measured along the frame, and (ii) the distance between the first end of the chain and the second end of the chain as measured along the chain. Movement of the first end of the chain in the first direction decreases the cutting confine, thereby providing a cutting action when the chain is positioned about a pipe.

In another aspect, the present invention provides a pipe cutter adapted for cutting relatively brittle pipe. The pipe cutter comprises a first frame section and a second frame section spaced from and engaged to the first frame section and defining an interior region therebetween. The pipe cutter also comprises a linearly displaceable ram disposed between the first frame section and the second frame section and generally within the interior region. The pipe cutter further comprises a selectively positionable slider block disposed between the first frame section and the second frame section and generally within the interior region. And, the pipe cutter comprises a cutting chain in operable engagement with the ram and with the slider block. Upon positioning the chain about a pipe targeted for cutting, application of a compressive force to the ram causes displacement of the ram toward the slider block and tensioning of the chain to thereby result in cutting of the pipe.

In yet another aspect, the present invention provides a pipe cutter adapted for engagement to a press tool having an extendable powered cylinder. The cutter comprises a frame adapted for engagement with the press tool. The cutter also comprises a selectively positionable slider block disposed and generally retained within the frame. The cutter further comprises a linearly displaceable ram guidably retained within the frame. The ram is movable toward the slider block upon application of a compressive force from the powered cylinder of the press tool. And, the cutter additionally comprises a cutting chain having a first chain section having a proximal end engaged to the ram and a first distal end, and a second chain section having a proximal end engaged to the slider block and a second distal end. The first distal end and the second distal end are selectively engageable with each other.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

The present invention provides a device for conveniently and quickly cutting relatively brittle pipes such as cast iron soil pipes. The device is adapted for selective and releasable engagement to a powered press tool and utilizes the action of the hydraulic cylinder or other powered cylinder of the press tool to tension a cutting chain, which when positioned about a pipe, readily severs or cuts the pipe. The terms "cut" or "cutting" as used herein refer to any type of action in which the targeted pipe is cut, severed or otherwise fractured generally along a desired or targeted location to result in the formation of multiple sections.

The cutting tool of the present invention is preferably adapted for use with a portable, hand-held press tool such as the CT-400 Press Tool, 320-E Press Tool, RP 330-B Press Tool, and RP 330-C Press Tool, all available from Ridge Tool Company of Elyria, Ohio under the designation RIDGID® Tools. It is also contemplated that the present invention tool if appropriately modified, can also be used with other press tools such as the Compact 100-B Press Tool and the Compact 210-B Press Tool, both available from Ridge Tool Company. However, the present invention cutting tool is not limited to use with only the previously noted press tools, as other press tools from other suppliers may also be acceptable. Generally, any press tool can be used in conjunction with the present invention cutting tool so long as the requisite press force and power can be delivered to the cutting tool and the mounting arrangements meet dimensional compatibility with the noted RIDGID® press tools. The preferred press tool for use with the present invention is of the type used for providing a press force to a removable jaw set engaged to the tool. Generally such press tools operate by activation of an internal electric motor which powers a hydraulic pump. The pump forces fluid into an onboard cylinder of the tool, thereby forcing a ram outward and applying thousands of pounds of press force to a jaw set that is engaged with the press tool. The present invention cutting tool is used in place of the jaw set. Examples of representative press tools besides the noted tools that may be suitable for use with the present invention cutting tool include, but are not limited to the press tools described in U.S. Pat. No. 7,124,608. These aspects are described in greater detail in conjunction with details of the preferred embodiments.

In accordance with the present invention, a preferred embodiment cutting tool is adapted to engage a press tool, and specifically, at the area of the press tool at which a press jaw set would be engaged. The cutting tool generally comprises a frame or support assembly, a movable ram disposed in the support assembly, an optional slide block (or slider block) preferably located at an end of the cutting tool opposite the end at which the cutting tool attaches to a press tool, and one or more cutting chains or cutting chain sections generally releasably attached or secured to the frame or support assembly. The cutting tool is used by attachment to a press tool, such as the previously noted Compact Press Tool 330-B from Ridge Tool Company. The cutting chain or the cutting chain sections are positioned about the outer periphery of a pipe or other workpiece to be cut or severed. The press tool is activated so that a hydraulic cylinder of the press tool is displaced toward the cutting tool attached to the press tool. The cylinder engages the ram of the cutting tool and moves the ram toward a distal end of the cutting tool. Displacement of the ram continues as the ram travels toward distal end. As the ram is displaced toward the distal end of the cutting tool, the cutting chain is tightened about the pipe or workpiece. Continuing displacement of the press tool hydraulic cylinder results in application of large forces to the cutting chain.

More specifically, the frame or support assembly of the cutting tool is preferably releasably engagable with a press tool. That is, for the previously noted Compact 330-B Press Tool, a removable jaw set is disengaged from the tool, and in its place, the present invention cutting tool is inserted. The frame or support assembly of the cutting tool defines a first or proximate end adapted for engagement with the press tool, a second or distal end opposite from the first end, and a generally hollow interior defined at least partly between the first and the second ends and accessible along an exterior region of the frame. The terms "proximal" and "distal" are frequently used herein in describing the cutting tool and its various components. The term proximal denotes a location that is near or relative to the end of the cutting tool that is closest to a press tool when the cutting tool is engaged therewith. And, the term "distal" denotes a location that is away from the end of the cutting tool frame at which the cutting tool is attached to a press tool. Typically, the distal end is the end opposite from the proximal end.

As previously noted, the preferred embodiment cutting tools generally comprise a frame or support assembly, a movable ram disposed within the frame, an optional slider block disposed proximate a distal end of the cutting tool, and one or more cutting chains or chain sections that are affixed to certain components and/or at particular locations within the assembly. Preferably, one end or location of the cutting chain is attached or otherwise engaged to the ram. And, preferably, another end or location of the cutting chain is attached or engaged to a distal end of the frame or to the slider block if such slider block is utilized in the cutting tool.

The frame is comprised of one or multiple members arranged and configured as desired. In one version, a pair of frame members are spaced apart and affixed together by the use of a plurality of spacers and fasteners extending therebetween. The frame and/or its members include engagement provisions for releasable engagement with a press tool. The engagement provisions as will be understood are located along a proximate end or face of the cutting tool. Preferably, the engagement provisions include an aperture extending through the frame or frame members for receiving an engagement pin from the nose of the press tool. The distal end region of the frame or distal end regions of the frame members include provisions for attachment of a cutting chain. If the previously noted slider block is used, the frame or frame members include provisions for releasably engaging and selectively positioning the slider block with respect to the frame and particularly, with respect to the distal end of the frame. The frame or support assembly can be an integral one piece member, or can be formed from a plurality of members. The preferred embodiments described later herein use frame assemblies that are formed from several components. This practice is favored as manufacturing costs are typically less as compared to forming an integral one piece unit. In view of the high forces applied within the interior and to the frame assembly itself, it is preferred that the frame assembly be formed from metal and most preferably from steel. Nearly any grade of steel as used in the tooling arts is acceptable. One or more outer anti-corrosion layers or coatings may be used on all outer surfaces of the press frame and/or its various components.

The cutting tool also comprises a movable ram or similar component generally retained within the frame. In one aspect, the ram is guidably retained between the frame members such that the ram is displaced between the distal and proximate ends of the frame, or at least regions therebetween. The ram also preferably defines a longitudinal opening extending through the ram. The ram is positioned and oriented within the frame such that the previously noted engagement pin of a press tool also extends through the longitudinal opening of the ram in addition to the apertures provided as engagement provisions along the proximate end of the cutting tool. The ram also includes provisions for engaging an end or region of a cutting chain. Thus, as the ram is displaced relative to the frame, the cutting chain end or region is also displaced. The ram may also be provided with provisions for attaching or otherwise engaging a biasing member to urge the ram toward the proximal end of the frame. These aspects are all described in greater detail herein, in association with several preferred embodiment cutting tools.

The cutting tool also comprises a cutting chain, or a plurality of cutting chain sections. One end of the cutting chain or a link or region of the chain, is attached to the ram as previously noted. And, another end of the cutting chain or a link or region of the chain or a different section of cutting chain is attached at a distal end of the cutting tool. The point of attachment is preferably at a distal end of the frame or frame members, or at a slider block which is generally positioned at or near the distal end of the cutting tool. If multiple chain sections are used, it is preferred to provide releasable engagement provisions on corresponding ends of the cutting chain as described in greater detail herein. It will be understood that the term "chain sections" as used herein refers to portions of the overall cutting chain used in the cutting tool which can be selectively and readily engaged with one another. Preferably, the chain sections can be readily engaged with another and disengaged from one another without the use of any tools. Thus, a user can easily disengage two or more chain sections from one another manually. And, a user can easily engage or otherwise attach two or more chain sections to one another.

As noted, in certain versions of the cutting tool, a selectively positionable slider block is used. The slider block is generally located proximate the distal end of the cutting tool. The slider block is coupled or otherwise attached to an end or region of a cutting chain. The slider block is selectively positionable and retained in or on the frame of the cutting tool. By positioning or otherwise selectively moving the slider block relative to the frame of the cutting tool, the slack of the cutting chain can be adjusted.

As described in greater detail herein, the cutting chain, when having both ends or two region(s) coupled to the frame or frame and slider block, defines a loop or bounded region. In order to cut or otherwise sever a pipe, the pipe is positioned within the loop or bounded region and the press tool actuated to decrease the size of the loop or bounded region, thereby eventually tightening the cutting chain about the outer periphery of the pipe until the pipe is cut, severed, or fractured. This bounded region is described in greater detail herein as a cutting confine.

Figure 1:
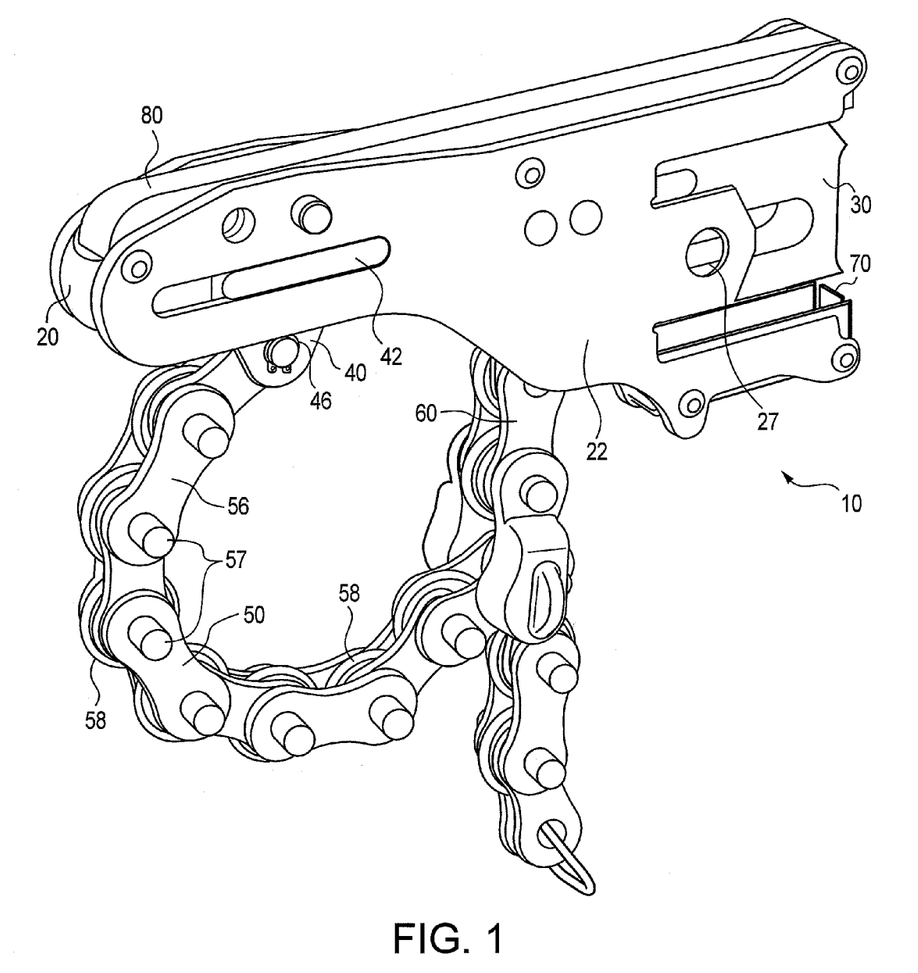
FIG. 1 is a perspective view of a preferred embodiment pipe cutter in accordance with the present invention.
Figure 2:
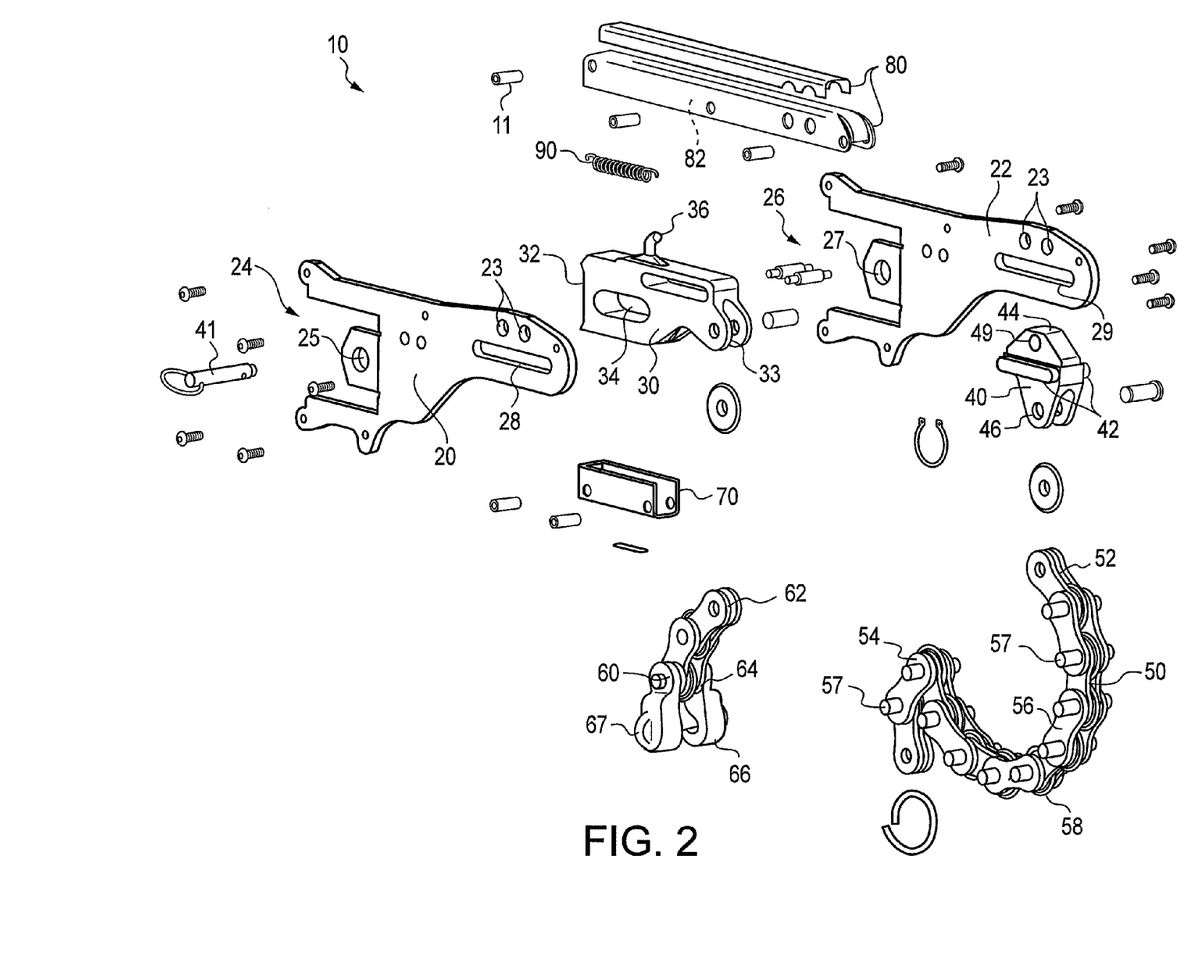
FIG. 2 is an exploded view of the cutter shown in FIG. 1 illustrating its components and assembly.

FIGS. 1 and 2 illustrate a preferred embodiment cutting tool 10 in accordance with the present invention. The cutting tool 10 comprises a frame assembly including a first frame section 20 and a corresponding second frame section 22. The frame sections upon assembly, are spaced apart oriented parallel to one another, and partially enclose or house a movable ram block 30, a selectively positionable slide block 40, a lower cover 70, and an upper cover 80. The cutter 10 also includes a cutting chain 50 and another chain section referred to herein as a chain hook 60. These components are all described in greater detail as follows.

Each of the frame sections 20, 22 defines a press tool receiving region and a corresponding engagement aperture for engaging the cutting tool 10 to a powered member such as a hydraulic cylinder of a press tool (not shown). Specifically, the frame section 20 defines a rearwardly directed receiving region 24 and an engagement aperture 25. And, the frame section 22 defines a rearwardly directed receiving region 26 and an engagement aperture 27. Upon attachment of the cutting tool 10 to a press tool, an engagement pin or member of the press tool is inserted into the frame engagement apertures 25, 27 for securing the cutting tool 10 to the press tool. Preferably, the frame sections 20 and 22 are retained in a spaced apart configuration by a plurality of spacers 11 extending between the sections. The spacers 11 are aligned with holes or apertures formed in the frame sections 20, 22 and threaded fasteners then inserted through the spacers 11.

The ram block 30 defines a rear push face 32 and forwardly directed engagement provisions 33 for securing an end of the chain hook 60 thereto. Upon engagement between the cutting tool 10 and a press tool (not shown), the powered member such as a hydraulic cylinder of the press tool contacts or eventually contacts the push face 32 of the ram block 30. The ram block 30 also defines an engagement slot 34. The engagement slot 34 receives the engagement pin of the press tool when the cutting tool 10 is attached thereto. As will be appreciated, the shape and configuration of the slot 34 enables the ram block 30 to move relative to the frame sections 20, 22. The ram block 30 also includes an outwardly projecting member 36 for attaching a biasing member 90, for example a spring, between the ram block 30 and the frame sections 20, 22 or more specifically, to a spacer 11 attached therebetween. The biasing member 90 then urges the ram block 30 in a rearward direction and promotes contact between the push face 32 and the powered member such as a hydraulic cylinder or rollers driven by the hydraulic cylinder of the press tool.

The slide block 40 is retained between the spaced apart frame sections 20 and 22, and forwardly positioned relative to the ram block 30. The slide block 40 defines a pair of laterally projecting guide members 42 that are slidably received in a corresponding set of guide slots 28 and 29 defined in the frame sections 20 and 22, respectively. The slide block 40 also defines a selector member 44 and oppositely directed chain engagement provisions 46. The chain engagement provisions 46 are for securing an end of the cutting chain 50 to the slide block 40. As explained in greater detail herein, upon assembly of the cutting tool 10, the slide block 40 is selectively positioned within the frame sections 20, 22 based upon the size of the pipe to be cut. The slide block 40, as a result of engagement of the guide members 42 received in the guide slots 28, 29, is positionable relative to the frame sections 20, 22. The slide block 40 is coupled to the cutting chain 50, and so by moving the slide block 40, the effective length of the cutting chain 50 can be changed. The cutting tool 10 includes provisions for securing or otherwise affixing the slide block 40 in a desired position such as by inserting a pin or other member through apertures in the frame sections 20, 22 and the slide block 40. Specifically, pin 41 is inserted through one of apertures 23 defined in the frame sections 20, 22 and an aperture 49 defined in the slide block 40 to secure the block 40 relative to the frame sections. It will be appreciated that the invention includes an array of different arrangements and number of apertures.

The upper cover 80 is affixed to the frame sections 20, 22 and preferably positioned therebetween. The upper cover 80 preferably includes a pair of sidewalls 82 which engage and contact the corresponding frame sections 20, 22. The upper cover 80 serves to enclose or at least partially enclose an interior region defined between the frame sections 20, 22. An upper outwardly directed face of the cover 80 may include various markings or indicia such as warning labels and pipe size designations corresponding to different positions of the slide block 40.

The lower cover 70 is also affixed to the frame sections 20, 22 and preferably positioned therebetween. The lower cover 70 also assists in enclosing the interior region defined between the frame sections 20, 22.

The cutting tool 10, as previously noted, also comprises a cutting chain 50 and a chain hook 60. The cutting chain 50 defines a proximal end 52 and an opposite distal end 54. The proximal end 52 is affixed to the chain engagement provision 46 of the slide block 40. The chain hook 60 includes a section of chain generally extending between a proximal end 62 and a distal end 64. The proximal end 62 is affixed to the chain engagement provision 33 of the ram block 30. The two distal ends 54 and 64 of the cutting chain 50 and the chain hook 60, respectively, are selectively engageable with one another. Although this selective engagement can be provided by use of a variety of assemblies, a chain post capture enclosure 66 attached to the distal end 64 of the chain hook 60 is preferred. Each of the cutting chain 50 and the chain hook 60 comprises a plurality of links 56, cutter wheels 58, and posts 57 on which the cutter wheels 58 are mounted and which posts movably connect adjacent links 56 to one another. As explained in greater detail herein, during use of the cutting tool 10, the cutting chain 50 is wrapped about a pipe to be cut and the chain post capture enclosure 66 is fitted over the nearest post 57 of the cutting chain 50. This operation engages the distal end 64 of the chain hook 60 to the distal end 54 of the cutting chain 50, thereby forming a loop of chain around the exterior of pipe to be cut. A two piece chain section may be desired for conveniently locating the point of attachment away from the tool, thereby improving access in latching and enabling ease of use.

The chain hook 60 may also include several additional features in accordance with the present invention. The chain post capture enclosure 66 is preferably provided as a one-piece integral assembly rather than two independently movable hooks or other capture mechanisms. The use of a single component serves to facilitate engagement of the enclosure 66 about a post 57, and disengagement therefrom. As will be appreciated by those skilled in the art, it is often difficult and tedious to achieve simultaneous engagement on both ends of a post, i.e. on both sides of a cutter wheel. Furthermore, it is preferred that the chain post capture enclosure 66 includes laterally projecting ears 67. These members facilitate grasping the enclosure 66 during engagement and/or disengagement with a distal end 54 of the cutter chain 50.

The cutting tool 10 is used to cut a pipe such as a cast iron soil pipe as follows. The tool 10 is engaged with a powered press tool such as for example, any one of the previously noted powered press tools available from Ridge Tool Company under the designation Ridgid®. The front nose and ram of the press tool is engaged with the cutting tool 10 by inserting the nose into the receiving regions 24, 26 defined by the frame sections 20, 22. The engagement pin of the press tool is inserted through the engagement apertures 25, 27 defined in the frame sections 20, 22 and through the engagement slot 34 defined in the ram block 30. Depending upon the size of the pipe to be cut, the appropriate position of the slide block 40 relative to the frame sections 20, 22 is selected and the slide block 40 is preferably locked in place. As will be understood, the linear position of the slide block 40 depends upon the size, i.e. the diameter, of the pipe to be cut. The cutting chain 50 and the chain hook 60 are then engaged to one another as previously described and in such a fashion that minimal slack exists in the resulting chain loop extending about the outer periphery of the pipe to be cut. The press tool is then activated to cause outward displacement of the ram and contact with the push face 32 of the ram block 30. Continued movement of the press tool ram and ram block 30 of the cutting tool 10 causes tensioning of the cutting chain 50 about the pipe, and eventual cutting or fracturing of the pipe.

The various preferred embodiment cutting tools define a cutting confine which may be understood as a region within which cutting or severing of a pipe or brittle article occurs. Specifically, the cutting confine is the sum of (i) the distance between an end of the cutting chain at its point of attachment to the ram and an end of the cutting chain (or collection of chain sections when connected to one another) at its point of attachment to the sliding block as measured along the frame of the tool; and (ii) the distance between these two locations as measured along the cutting chain. The sum of distances (i) and (ii) is referred to herein as the cutting confine.

Prior to performing a cutting operation, the pipe or article to be cut is positioned within the cutting confine. Upon operation of a powered press tool, the ram is urged forward toward the slider block thereby reducing distance (i). This in turn also reduces the total distance of the cutting confine. This action, as will be understood, results in cutting or severing of the pipe or article from increasing tension of the cutting chain.

Figure 3:
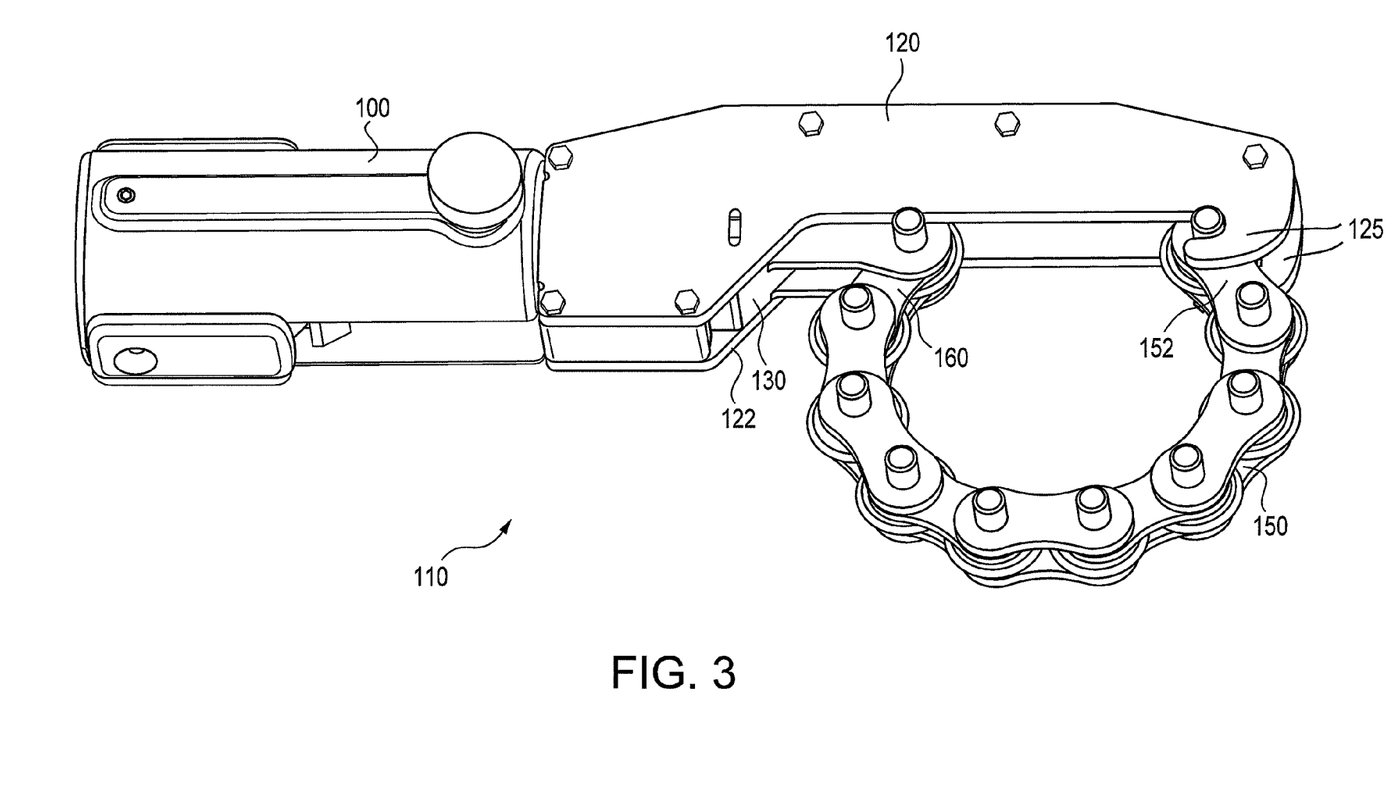
FIG. 3 is an illustration of another preferred embodiment cutter and its engagement with a front portion of a press tool in accordance with the present invention.

FIG. 3 illustrates another preferred embodiment cutting tool 110 in accordance with the present invention. The cutting tool 110 includes frame sections 120, 122; a slidable ram block 130 disposed between the frame sections 120, 122; and a single cutting chain 150. The tool 110 is free from a slide block such as slide block 40 in the previously described tool 10. And, the tool is free from a two component cutting chain as utilized in the tool 10, i.e. the cutting chain 50 and the chain hook 60. In certain regards, it may be preferred to utilize a simplified configuration such as that exemplified by the tool 110. The cutter chain 150 defines a proximal end 160 affixed to the ram block 130 and a distal end 152 that is releasably engageable with a slotted end region 125 of the frame sections 120, 122. FIG. 3 depicts the cutting tool 110 engaged to a nose portion of a press tool 100. The general configuration and assembly of the cutting tool 110 corresponds to that of the previously described cutting tool 10.

Figure 4:
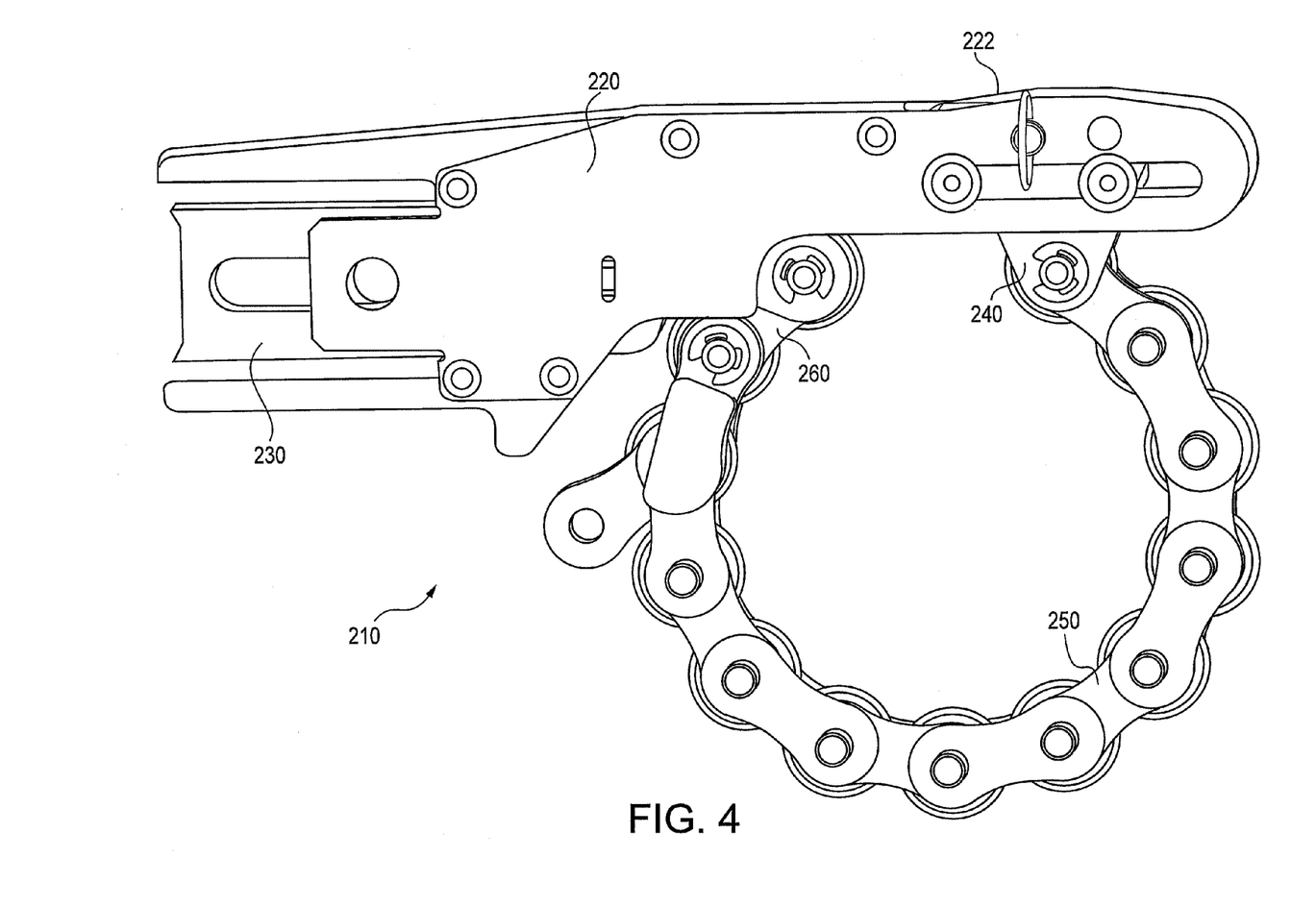
FIG. 4 is an illustration of yet another preferred embodiment cutter in accordance with the present invention.

FIG. 4 illustrates another preferred embodiment cutting tool 210 in accordance with the present invention. The cutting tool 210 includes frame sections 220, 222; a slidable ram block 230 and a slide block 240 disposed between the frame sections 220, 222; and a cutting chain 250 and a chain hook 260. The general configuration and assembly of the cutting tool 210 corresponds to that of the previously described cutting tool 10. The cutter tool 210 includes a slide block 240 and multicomponent chain section, i.e. chains 250, 260.

All components of the preferred embodiment cutting tools described herein are formed of materials that exhibit sufficient strength, rigidity, and durability for repeated and consistent tool use. Preferably, the frame sections, ram block, and slide block are formed from steel or other alloys of comparable strength. The cutting chain and chain hook and associated cutting wheels, links, and posts are preferably formed from steel or other suitable materials. Hardened steel is preferred for the cutting wheels.

The present invention includes alternate versions or modifications of the preferred embodiment cutting tools described herein. For example, instead of a multiposition, selectively moveable configuration for the sliding block, i.e. in which the sliding block can be selectively positioned to one of two or more positions relative to the frame, the cutting tool could use an absolute position adjustment configuration. In this version, the sliding block could be selectively positioned within its range of travel and then selectively locked in that position, such as by a sliding latching mechanism. This mechanism would allow the latching point to be set at the most common pipe size settings or cutter wheel distances. One or more locking pins and corresponding holes, grooves, or load bearing spacers could be used to secure the sliding block in the desired position. Alternatively, a feed screw latching mechanism could be used in which initial chain slack could be reduced or eliminated by adjustment of a screw assembly.

The present invention cutting tool can be used to cut a wide range of pipe sizes, such as from 1½" to 4" size pipes. The cutting tool is configured by appropriate positioning of the slide block, to accommodate this range by providing a first size range of 1½", 2", and 4" and a second size range for 3" pipes. Depending upon a user's preferences, it may be preferred to not use a selectively positionable slider block for adjusting the cutter chain length. Thus, where application requirements stress ease in use and simplicity, a tool version similar to that depicted in FIG. 3 and free of a sliding block may be preferred. It will be understood that the present invention cutting tools can be used for cutting pipes having sizes different than these, for example smaller than 1½", and/or greater than 4".

Furthermore, although the present invention cutting tool has been described for cutting cast iron pipe, it will be appreciated that pipes of other materials can also be cut or otherwise severed using the present invention tool.

Although the present invention cutting tool has been described for use with a powered press tool using a hydraulic cylinder, it will be appreciated that the present invention cutting tool can be used with nearly any type of powered ram, manual ram, or mechanical assemblies. For example, a variety of force multiplying assemblies could be used to provide a force input to the sliding ram component of the present invention tools. Thus, it is contemplated that the cutting tools can be used with pneumatically driven rams or mechanical assemblies that provide a powered ram or other component for engaging the ram block in the present invention tool. An example of another component besides a manual or powered ram for providing a force input to the sliding ram, is a feed screw assembly. Thus, simply by rotating a screw assembly, a linear force could be applied to the sliding ram component of the present invention tool. This force, as will be understood, would then be applied to tighten a cutter chain about a pipe to be cut.

The preferred embodiment cutting tools provide numerous advantages over prior art tools. For example, the preferred embodiment tools are relatively small and portable. This enables the tools to be readily transported and as previously explained, used in a wide range of limited access environments.

The preferred embodiment cutting tools also provide relatively fast set up since the tools need only be engaged with a press tool, the slider block position selected, and the chain positioned about the pipe to be cut.

Furthermore, the cutting tools provide relatively fast set up and cutting times, typically in less than 30 seconds.

Additionally, the tools can be provided with dimensional designations for pipe size and simple adjustments which enable the tools to be used with a wide range of pipe sizes.

Moreover, depending upon the configuration of the press tool to which the cutting tool is engaged, the cutting tools can be rotated about their longitudinal axis even after engagement to a press tool. This facilitates orientation of the tool to better accommodate the particular aspects of the targeted pipe, particularly when in an installed state. Specifically, if the press tool has a rotating head, then upon engagement with such press tool, the cutting tool of the invention can then also be readily rotated about its longitudinal axis along with the head of the press tool. As will be appreciated, increased ease of changing orientation of the cutting tool promotes versatility of the tool. In the event that the cutting tool is used with a press tool that does not feature a rotating head, then the cutting tool can still be used at one of two positions, each oriented 180° from the other, by appropriate selection of the desired position for the cutting tool relative to that of the press tool.

Although it is preferred that the preferred embodiment cutting tools are used by attachment or coupling to a hand-held portable, typically battery powered, press tool; it will be appreciated that the tools can be used with a wide array of other force-generating devices. Further, it is not necessary that the preferred embodiment cutting tools be used in conjunction with hand-held press tools. Instead, the cutting tools can be used with non-portable or stationary press tools. And, it will be readily understood that the preferred embodiment cutting tools can be used with a variety of press tools or force-generating assemblies that are not battery powered, but instead, powered from other machine or human powered sources.

Many other benefits will no doubt become apparent from future application and development of this technology.

All patents, published applications, and articles noted herein are hereby incorporated by reference in their entirety.

It will be understood that any one or more feature or component of one embodiment described herein can be combined with one or more other features or components of another embodiment. Thus, the present invention includes any and all combinations of components or features of the embodiments described herein.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as described herein.

What is claimed is:

1. A pipe cutter adapted for cutting relatively brittle pipe, the pipe cutter comprising:
    a first frame section and a second frame section spaced from and engaged to the first frame section and defining an interior region therebetween;
    a linearly displaceable ram disposed between the first frame section and the second frame section and generally within the interior region;
    a selectively positionable slider block disposed between the first frame section and the second frame section and generally within the interior region; and
    a cutting chain assembly in operable engagement with the ram and with the slider block;
    wherein upon positioning the cutting chain assembly about a pipe targeted for cutting, application of a compressive force to the ram causes displacement of the ram toward the slider block and tensioning of the cutting chain assembly to thereby result in cutting of the pipe.

2. The pipe cutter of claim 1 wherein the first frame section and the second frame section include engagement provisions for releasably engaging the pipe cutter to a press tool such that a powered cylinder is engageable with the linearly displaceable ram.

3. The pipe cutter of claim 2 wherein the engagement provisions include a pair of aligned apertures defined in the first and second frame sections.

4. The pipe cutter of claim 3 wherein the linearly displaceable ram defines an engagement slot, the slot sized and oriented such that as the ram disposed between the frame sections is linearly displaced, at least a portion of the slot is aligned with the pair of aligned apertures.

5. The pipe cutter of claim 1 wherein the cutting chain assembly includes a first chain section having a proximal end engaged to the ram and a first distal end, and a second chain section having a proximal end engaged to the slider block and a second distal end, wherein the first distal end and the second distal end are selectively engageable with one another.

6. The pipe cutter of claim 5 wherein the first distal end includes a capture enclosure and the second distal end includes a chain post, the capture enclosure including provisions to selectively engage the chain post.

7. The pipe cutter of claim 1 wherein the slider block defines an aperture and the first and second frame sections define at least one pair of aligned apertures, the slider block being selectively positionable by positioning the slider block relative to the first and second frame sections such that the aperture defined in the slider block is aligned with the at least one pair of aligned apertures in the first and second frame section and inserting a member through the aligned apertures.

8. The pipe cutter of claim 1 further comprising a biasing member extending between at least one of the first and second frame sections and the linearly displaceable ram such that the ram is urged away from the slider block.

9. A pipe cutter adapted for engagement to a press tool having an extendable powered cylinder, the cutter comprising:
   a frame adapted for engagement with the press tool;
   a selectively positionable slider block disposed and generally retained within the frame;
   a linearly displaceable ram guidably retained within the frame, the ram movable toward the slider block upon application of a compressive force from the powered cylinder of the press tool; and
   a cutting chain assembly having a first chain section having a proximal end engaged to the ram and a first distal end, and a second chain section having a proximal end engaged to the slider block and a second distal end, wherein the first distal end and the second distal end are selectively engageable with each other.

10. The pipe cutter of claim 9 wherein the first distal end includes a capture enclosure and the second distal end includes a chain post, the capture enclosure including provisions to selectively engage the chain post.

11. The pipe cutter of claim 9 further comprising a biasing member extending between at least one of the first and second frame sections and the linearly displaceable ram such that the ram is urged away from the slider block.

12. The cutter of claim 9 wherein the ram defines a rearwardly directed face at which the powered cylinder of the press tool contacts to thereby move the ram toward the slider block.

13. A pipe cutter comprising:
   a frame adapted for engagement with a press tool providing an extendable powered cylinder;
   a linearly displaceable ram guidably retained within the frame, the ram movable in a first direction upon application of a compressive force from the powered cylinder;
   a cutting chain assembly having a first end coupled to the ram and configured to be movable in the first direction upon application of the compressive force to the ram, the cutting chain assembly also having a second end selectively stationary and engaged to the frame; and
   a slide block retained within the frame, the second end of the cutting chain assembly being engaged to the frame via the slide block;
   wherein a cutting confine is defined by a portion of the frame, the first end of the cutting chain assembly coupled to the ram, the second end of the cutting chain assembly engaged to the frame, and a length of the cutting chain assembly;
   wherein the movement of the first end of the cutting chain assembly in the first direction decreases the cutting confine, thereby providing a cutting action.

14. The pipe cutter of claim 13 wherein the first end of the cutting chain assembly is releasably engaged to the ram.

15. The pipe cutter of claim 13 wherein the slide block is selectively positionable with respect to the frame.

16. The pipe cutter of claim 13 wherein the ram defines a rearwardly directed face at which the force from the powered cylinder is applied.

17. The pipe cutter of claim 13 wherein the cutting chain assembly includes a first chain section having a proximal end and a distal end and a second chain section having a proximal end and a distal end, the proximal end of the first chain section constituting the first end and the proximal end of the second chain section constituting the second end, the distal end of the first chain section being selectively engageable with the distal end of the second chain section.

18. The pipe cutter of claim 17 further comprising:
   a capture enclosure affixed to the distal end of the first chain section, the capture enclosure configured to selectively engage the distal end of the second chain section.

19. The pipe cutter of claim 13 further comprising:
   a biasing member extending between the frame and the ram and configured to urge the ram in a direction away from the second end of the cutting chain assembly.

* * * * *